Figure 3:
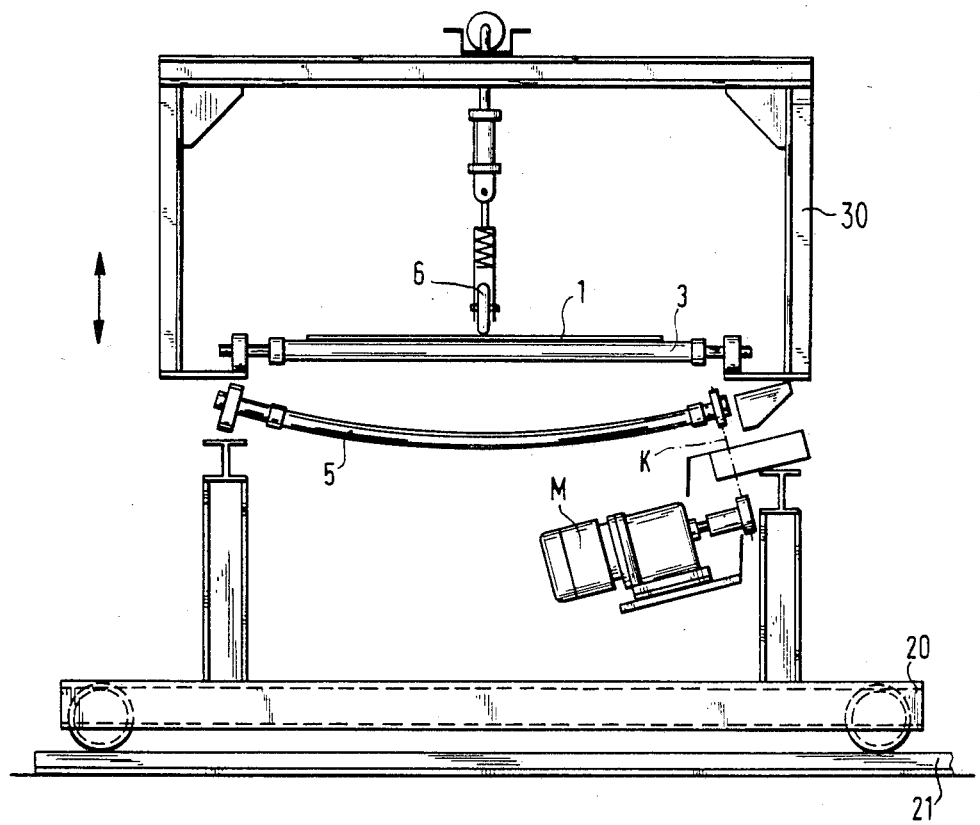

United States Patent [19]

Kramer et al.

[11] Patent Number: 4,586,946
[45] Date of Patent: May 6, 1986

[54] EQUIPMENT FOR CURVING GLASS SHEETS

[76] Inventors: Carl Kramer, Am Chorusberg 8, 5100 Aachen; Karl-Heinz Dicks, Stüttegasse 6a, 5107 Lammersdorf, both of Fed. Rep. of Germany

[21] Appl. No.: 464,770

[22] Filed: Feb. 7, 1983

[51] Int. Cl.[4] ............................................. C03B 23/033
[52] U.S. Cl. ........................................ 65/273; 65/106; 65/287
[58] Field of Search .................. 65/106, 286, 287, 273

[56] References Cited

U.S. PATENT DOCUMENTS

| 2,298,709 | 10/1942 | Long | 65/348 |
| 3,701,644 | 10/1972 | Frank | 65/106 |
| 3,856,499 | 12/1974 | Frank | 65/106 X |
| 3,905,794 | 9/1975 | Revells et al. | 65/106 |
| 4,139,359 | 2/1979 | Johnson et al. | 65/107 |
| 4,218,232 | 8/1980 | Wilhelm | 65/106 |
| 4,252,552 | 2/1981 | Frank | 65/106 |

FOREIGN PATENT DOCUMENTS

| 1190135 | 4/1965 | Fed. Rep. of Germany . |
| 1679961 | 10/1972 | Fed. Rep. of Germany . |
| 2331584 | 8/1975 | Fed. Rep. of Germany . |
| 2532318 | 8/1979 | Fed. Rep. of Germany . |
| 3150859 | 3/1983 | Fed. Rep. of Germany . |
| 1163547 | 9/1958 | France . |
| 2118855 | 8/1972 | France . |
| 2144523 | 2/1973 | France . |
| 2068358 | 8/1981 | United Kingdom . |
| 2094290 | 9/1982 | United Kingdom . |

OTHER PUBLICATIONS

German Publication No. 2621902.

Primary Examiner—Arthur Kellogg
Attorney, Agent, or Firm—Finnegan, Henderson, Farabow, Garrett & Dunner

[57] ABSTRACT

Straight advance bars in the shaping region are moved plumb downward between the upper advance position and the lower shaping position for the purpose of curving glass sheets heated to the softening point; a pressing means is deposited in time-relation to this motion on the top side of the glass sheet and together with the advance bars is displaced downwardly; when in the shaping position, the glass sheet rests on stationary forming bars curving plumb downwardly and of which the shape is fitted to the desired curvature of the glass sheet. The shaping region is followed by a tempering zone wherein the curved glass sheets are cooled by gas-blowing without their surfaces being affected thereby.

14 Claims, 6 Drawing Figures

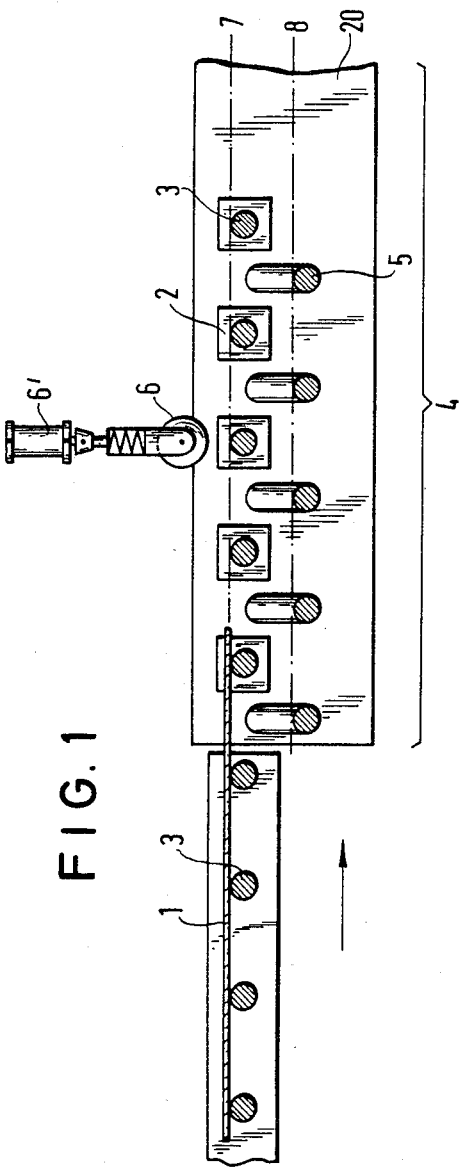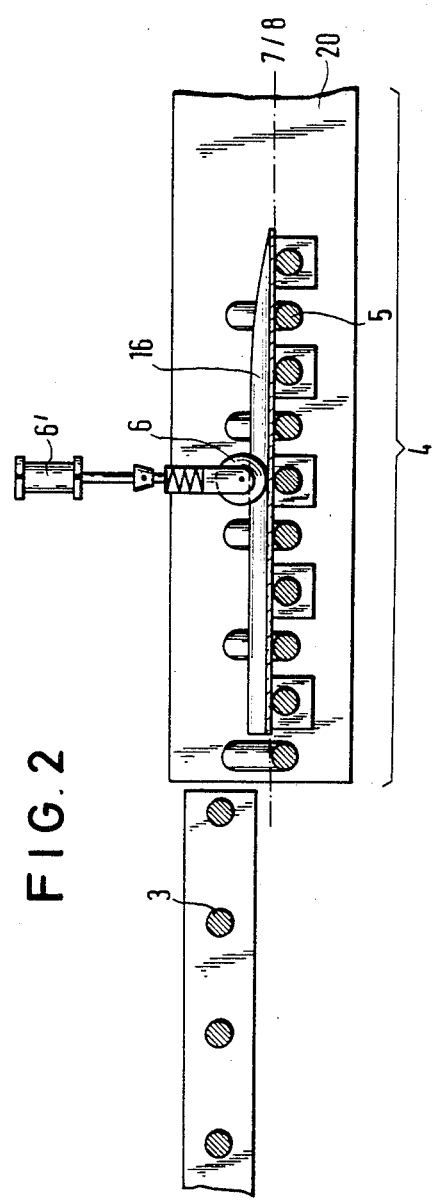

EQUIPMENT FOR CURVING GLASS SHEETS

DESCRIPTION

The invention concerns equipment for curving glass sheets heated to the softening point and of the species stated in the preamble of the claim 1.

Equipment for curving glass sheets heated to the softening point temperature is known from the German Pat. No. 1 679 961 and German Pat. No. 2 331 584, bars bent in the surface plane of the shaping means being used; each bar can be rotated about an axis passing through its two ends, whereby the plastic glass pane is deformed according to the shape of the bars. The bending force is achieved by pressing the glass sheet against a mating forming means or mating rollers shaped similarly to the shaping bars. This equipment suffers from drawbacks concerning the problems of maintaining an accurate bend line. Thus different lateral forces are generated on both sides of the longitudinal axis when advancing flat glass sheets which are asymmetric with respect to the axis of advance in the horizontal advance plane on the bent shaping bars which however are pivoted into a horizontal transport plane. As a result the sheet is readily susceptible to lateral flow and consequently the angle between the desired bend axis and the actual one, which coincides with the direction of advance can deviate from null.

Another drawback is that when the bent shaping bars are pivoted out and up, the glass sheet no longer assumes a stable position, being guided only centrally. Further problems, which degrade the optical quality especially for thin glass sheets, are due to the areal contact regions of which the increased heat exchange results in a locally different and higher cooling of the glass sheet, and where mating rollers are used as shaping means, they are due to the mating roller effect which produces transverse waves especially in thin and compliant glass sheets and makes more difficult the fabrication of optically problem-free curved glass sheets.

In the equipment of the German Auslegeschrift No. 2 621 902, the glass sheet moves on shaping bars which are bent convexly upward and of which the inside gauge of the bend line increases in the direction of advance. The shape of the heat-softened sheet adapts to the bent shape of the bars on account of gravity. Again this equipment suffers from a grave drawback in that the line of curvature is not accurately fixed. On the other hand the inaccuracies regarding the desired curvature will be the larger the more irregularly the glass sheet was shaped. For instance tapering glass sheets meet with nearly insurmountable difficulties because the differentially shaped partial surfaces undergo differential gravity effects on both sides of the axis of curvature and accordingly the whole curving process takes place differentially.

Lastly the German Pat. No. 2 532 318 discloses equipment for curving glass panes heated to the softening point; the shaping bars consist of a core and a rotatable, driven outer cover, for instance a sleeve; when the still flat glass sheet is moved nearer, it is pivoted into a horizontal position, resulting in a horizontal advance plane; the curved shaping bars are pivoted downward to initiate the curving process. The actual curving is achieved by lifting the entire system with the shaping bars and pressing against a mating forming means. This equipment enjoys the substantial advantage in permitting precise positioning of the sheet; but it suffers from the drawback that the glass must be stopped during the curving process proper, that is, continuous advance is impossible. Furthermore this equipment also incurs the drawback already cited above, namely that the still flat glass sheet must be moved on the curved shaping bars that were pivoted into a horizontal plane and that during this advance lateral motions take place which are difficult to control.

Accordingly it is the object of the invention to create equipment for curving glass sheets heated to the softening point temperature, and which is of the stated species and for which the above cited drawbacks are absent.

In particular the invention proposes equipment assuring on one hand the guidance of the still flat glass sheet and on the other hand the uniform curving even of extremely thin glass sheets without optical defects.

This object is achieved in the invention by the features stated in claim 1.

Appropriate embodiments are listed in the dependent claims.

The advantages achieved by the invention rest on the following operation:

The glass sheets arriving from the furnace and heated to the softening point, that is, plastically deformable but still plane, are moved by several straight advance bars into the shaping region proper; stationary and downwardly curved forming bars are mounted in this shaping region between the individual advance bars. When the sheet in the course of its advance motion enters the shaping region, a pressing device, for instance consisting of a pressing roller with a compression cylinder, is first lowered from above on the sheet surface. This pressing roller is located precisely plumb above a straight advance roller, so that no bending moment can be generated which might cause transverse waves in susceptible glass sheets.

The straight advance bars are correspondingly moved downward in time-relation to this downward motion of the pressing device; this can be implemented for instance in that at the time of placing the pressing roller on the surface of the sheet, the downward motion of the advance bars shall also begin. The advance bars are moved downward into a shaping position which again corresponds to the position of stationary, downwardly curved forming bars. As a result, the plastic glass sheet is deformed into the desired curved shape.

The glass sheet is being advanced during this entire procedure, any relative motion between the outer covers of the bars and the glass sheet being avoided by the curved forming bars pointing precisely vertically down. While this requires adapting the forming bars to the sheet shape in every case, on the other hand a very substantial advantage with respect to the optic quality of the curved glass sheet is achieved, namely that no relative motion takes place whereby minor additional but optically detectable warps might be produced.

To facilitate the exchanging of the curved forming bars in accordance with the desired curvature of the glass sheets, the forming bars are mounted on a separate structure which is easily exchangeable by moving it out on rails.

As a rule the pressing roller will be freely rotating, so that upon touching the glass sheet the latter will carry it along; however with respect to extremely thin and susceptible glass sheets it may be appropriate to start up the pressing roller to correspond to the rate of advance of the glass sheets in order to prevent any kind of relative motion in this case too.

The implementation of the curving process without changing the rate of advance of the glass sheet brings with it the advantage of the glass sheet dwelling only a brief time in the shaping region proper and therefore losing only little heat, that is, the glass sheet will arrive at nearly the same temperature it had when leaving the furnace preceding the shaping region, at the subsequent tempering zone.

Furthermore the pressing roller lowered from above onto the sheet only touches it over a very small area, whereby only a very minor heat exchange takes place with the hot sheet surface. This too contributes to keeping the glass sheet at the desired high temperature.

After the curved glass sheet has been moved by the curved forming bars out of the shaping region, the straight advance rollers in the shaping region are moved upward, for instance by means of compressed-air cylinders, in a very short time into the advance position, whereby presently a new glass sheet can enter the shaping region.

The use of practically stationary curved forming bars brings with it the advantage of requiring no adjustment of the individual forming bars, rather that only an entire set of forming bars must be exchanged in adaptation to a change in the curvature of the glass sheet. As regards the known apparatus, requiring individual pivoting of the forming bars, expensive adjustments were necessary, which nevertheless could not be carried out as a rule with the desired accuracy, so that wavy deformations of the curved glass sheet ever would be incurred. This is prevented by the simple design described herein.

Appropriately the rate of advance of the flat glass sheet is higher when leaving the furnace than when within the furnace itself, so that this glass sheet will be guided at relatively high speed through the shaping range and so that in the case of forming bars of relatively little curvature there shall be less time for the plastic glass pane to "sink into" the spaces between the forming bars. In this manner a wavy structure of the surface of the curved glass pane shall be prevented.

The structure of the tempering section following the shaping region and wherein typically the curved glass sheet is adequately rapidly cooled by blowing onto it a gas jet, generally a jet of air, is essential in the manufacture of high-quality, curved tempered glass sheets. A tempering zone wherein the glass sheet is guided from above and from below through the advance bars is known from the German Auslegeschrift No. 2 213 670. These advance bars however interfere with the flow of the gas jets at the upper and lower sheet sides, in particular they hamper the evacuation, so that the desired rapid cooling is not achieved. This tempering section furthermore neglects that in addition to the desired generation of a backup-pressure cushion in the area of the bars, these bars also cause precisely a reduction in heat transfer. Therefore, to achieve the desired heat transfer, substantially higher drive-powers for the flow must be applied. As long as such a tempering section is used to treat only relatively thick glass sheets, this drawback will not be prohibitive; but when furthermore thin glass sheets, for instance glass sheets for the side windows of motor vehicles, which are only 3 mm thick, must be tempered, than a substantial increase in the air flow rate will also be mandatory. However, the generated pressure also increases as the square with the speed, and this pressure will cause, especially where thin glass sheets are concerned, deformation of the surface and inadmissible degradation of the optical quality.

To prevent these drawbacks, nozzles are placed in the tempering zone following the shaping region between the curved forming bars and underneath the glass pane, and further ribs of nozzles precisely opposite the nozzles on the underside and adapted to the pane contour, are mounted on the upper side of the glass sheet, and further ribs of nozzles precisely opposite the the glass sheet without thereby generating additional pressure-backup zones hampering the heat transfer, throttles are integrated into the return-flow sections between the upper ribs of nozzles. These throttles on one hand prevent buoyancy effects in the glass sheets due to any increase in the lower excess pressure, and furthermore they may even cause a slight compression of the glass sheets.

By suitably selecting the bores and their mutual spacings in the upper and lower nozzle-ribs, the same heat transfer can be assured at the upper and lower sides of the glass sheet even in the case of unequal flows.

In an alternative to this embodiment, the curved forming bars can be integrated into the lower blower system, and making use of the Coanda effect, the gas flow is guided along the advance bars and is pointed tangentially at the curved glass sheet. In this manner the advance and forming bars, which in the conventional tempering sections are hampering in nature, now can be used as guide means for the flow and thereby improve the gas flow effect in the sense of quicker cooling.

The invention is discussed in further detail below in relation to illustrative embodiments and the attached, schematic drawings.

Figure 4:
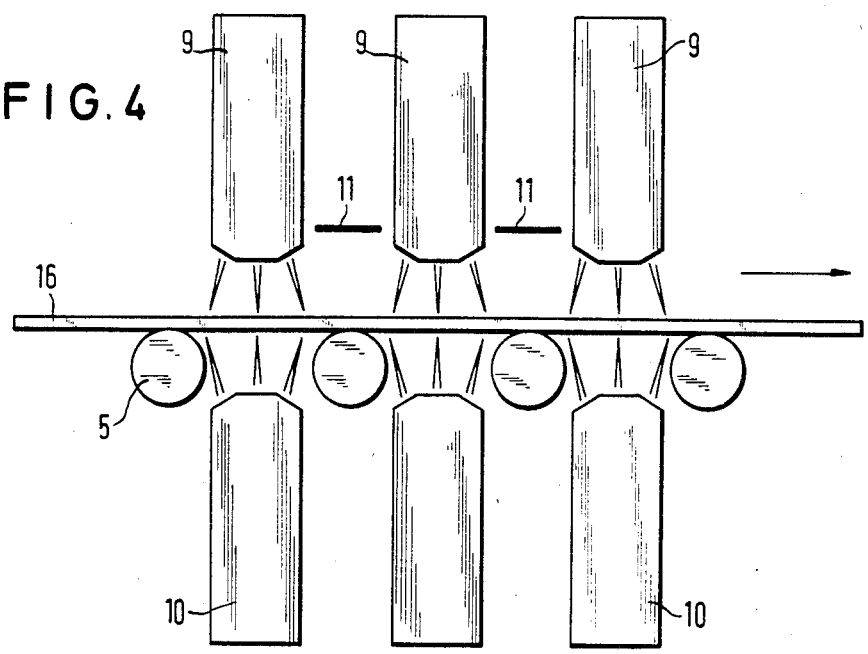
Figure 5:
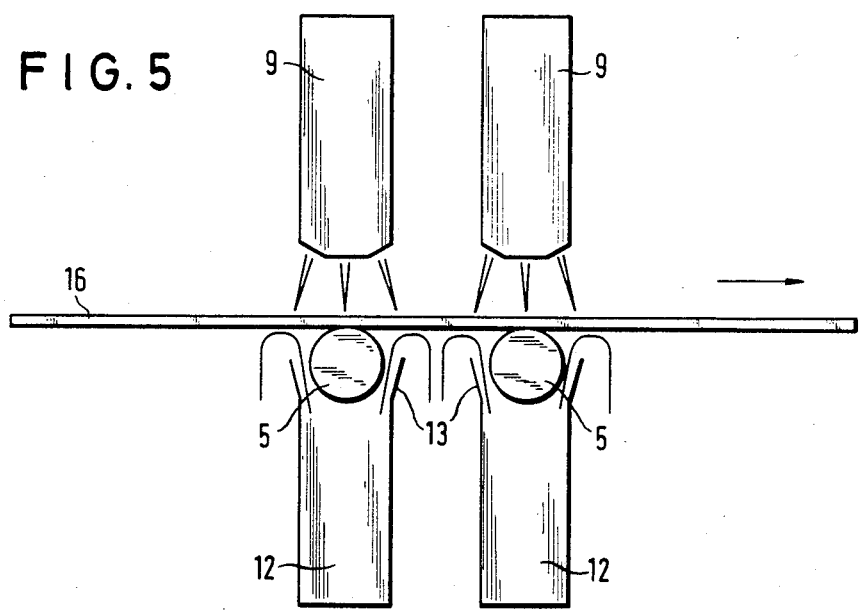
Figure 6:
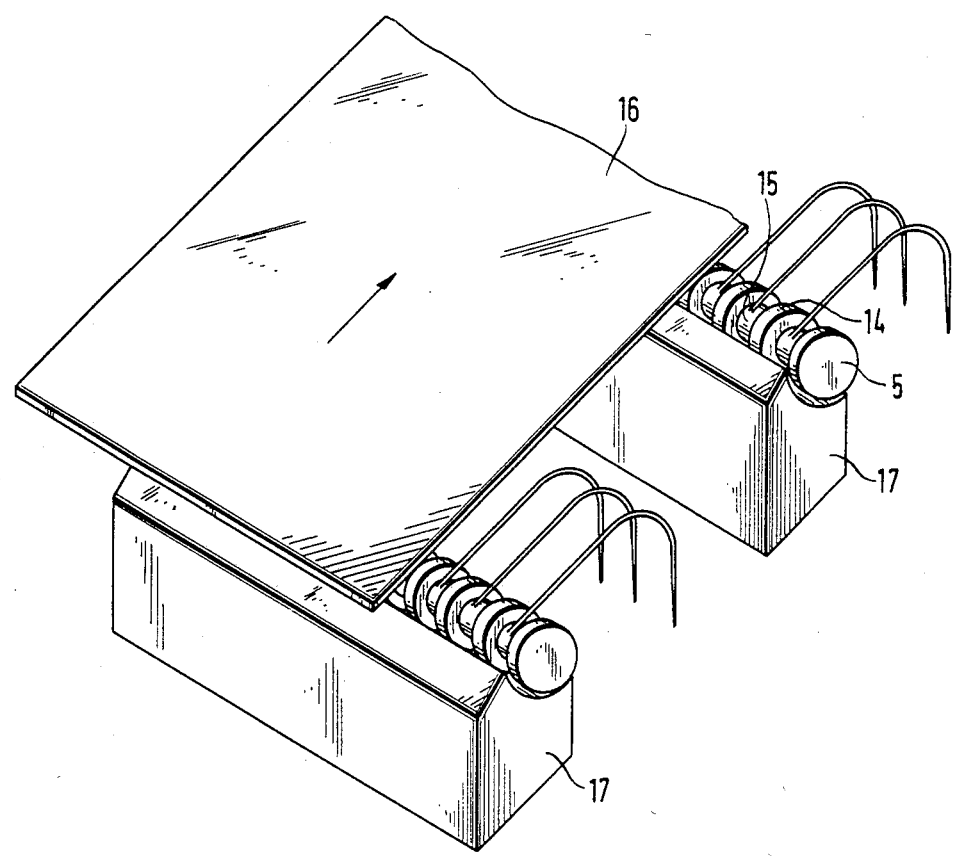

FIG. 1 is a longitudinal section of the shaping region, the straight advance bars being in the advance position, FIG. 2 is a longitudinal section of the shaping region, the straight advance bars having been lowered into the shaping position, FIG. 3 is a cross-section of the shaping region, FIG. 4 is a first embodiment of a tempering zone following the shaping region, FIG. 5 is a second embodiment of a tempering zone following the shaping region, and FIG. 6 is a perspective of a modified embodiment of FIG. 5.

As indicated in FIG. 1, a plane glass sheet 1 heated to the softening point temperature by an omitted furnace is moved by straight advance bars 3 together forming a set of rollers 2 to the actual shaping region 4. Again straight advance bars 3 are mounted in the shaping region 4; forming bars 5 are mounted between every two adjacent advance bars 3 (FIG. 3); these forming bars 5 correspond to the desired curvature of the glass sheet 1 and are located underneath the straight advance bars 2, as indicated by the schematic apex line 8.

The moment the glass sheet 1 has been fully moved into the shaping region 4, a pressing roller 6 is lowered from above onto the upper side of the glass sheet 1; this pressing roller 6 is loaded by a pressing cylinder 6' which generates a precisely defined compression.

The pressing roller 6 and the pressing cylinder 6' are supported in a yoking-structure 30 which is solidly joined to the support means for the advance bars 3 in the shaping region 4. The structure 30 and hence also the pressing roller 6 on one hand, and the straight advance bars 3 in the shaping region 4 on the other hand, can be displaced together plumb downward.

The moment the freely rotating pressing roller 6 pointed in the direction of advance of the glass sheet 1 touches the upper side of the glass sheet 1 located entirely within the shaping region 4, the pressing roller 6 and the straight advance bars 3 in the shaping region 4 are lowered until the upper contact-plane 7 of the straight advance rollers 3 coicides with the lower apex line 8 of the curved forming bars 5. Because the pressing roller 6 is located precisely above a straight advance bar 3, no bending moment at all is transmitted in this procedure.

During the entire procedure, the glass sheet 1 is being moved through the shaping region 4 in the direction of the arrow, whereby the desired curvature is imparted to the glass sheet 1 in the course of this motion by the cooperation of the pressing roller 6 and the curved forming bars 5.

The curved forming bars 5 are rigidly mounted in a structure 20 which can be exchanged by moving it out of the way laterally on rails 21. Such an exchange may be required for instance when glass sheets are to be manufactured with different curvatures, the curvature of the curved, plumb down-pointing forming bars being adapted in each case to the desired glass sheet curvature.

The designs of the advance bars 3 and the forming bars 5 are conventional, that is, they consist of a core surrounded by an outer, rotatable, driven cover; this outer cover illustratively may consist of one correspondingly shaped sleeve or also of several rings slipped onto the core.

The curved glass sheet 16 is moved out of the shaping region 4 by means of the rotation of the outer covers of the curved forming bars 5 and arrives at the tempering zone which will be further explained below. Next the straight advance bars 3 in the shaping region are moved up by omitted compressed air cylinders into the advance position (FIG. 1), so that now the next glass sheet 1 can enter the shaping region 4.

FIG. 4 shows a cut-away portion of the tempering zone following the shaping region 4. The curved glass sheet 16 is guided by curved forming bars 5, acting in this instance as advancing means, through the tempering zone. Nozzle-ribs 10 are mounted in the spaces between the curved forming bars 5 and below the curved glass sheet 16. Precisely opposite these lower nozzleribs 10 are located similar upper nozzle-ribs 9* above the curved glass sheet 16 passing through the tempering zone in the direction of the arrow. The nozzle-ribs 9 and 10 are fitted to the shape of the glass sheet and then direct air jets onto it, these airjets impinging the glass sheet 16 both vertically and obliquely.

*Translator's note: "10" in original.

To increase the pressure above the glass sheet 16 without thereby generating additional pressure-head zones degrading the heat transfer, throttles 11 are integrated in the return-flow areas between the upper nozzle-ribs 9; these throttles on one hand prevent buoyancy of the glass sheets 16 due to an increase in the excess pressure underneath the glass sheet 16; furthermore they permit slightly pressing the glass sheets 16 from above against the curved forming bars 5.

By a suitable selection of the diameters and the spacings between the holes, the upper nozzle-ribs 9 may be so adjusted with respect to the lower nozzle-ribs 10 that despite uneven flow on the upper side of the glass sheet 16, the same heat transfer will be assured as on the lower side.

FIG. 5 shows another embodiment of a tempering zone; here the curved forming bars 5 are integrated into the lower blowing system, namely in that which is below the glass sheet 16. FIG. 5 indicates schematically that the gas flows along the curved, cross-sectionally circular forming bars 5 by means of the Coanda effect and tangentially impacts the curved glass sheet 16 in the manner in which it is important to achieve good heat transfer. Thus the jets of gas do not directly impinge on the sheet surface, and this is a substantial consideration with respect to the optical properties of the curved glass sheets 16.

In this embodiment, the upper nozzle-ribs 9 are mounted precisely above the center line of the curved forming bars 5, whereby the force due to flow exerts no bending moment on the curved glass sheet.

The curved forming bars can be integrated into the array of nozzles for instance by having slit-shaped jets enclose the forming bars 5 on both sides.

Alternatively the rotatable outer covers of the forming bars 5 may consist of rings 14, as shown in FIG. 6. Annular channels 15 are formed between these rings 14; air is blown out of the supply nozzles 17 arranged below the forming bars 5, either through all the annular channels 15 of each forming bar 5 in the same direction, or in a different direction for different annular channels 15 of each forming bar. In the area of contact between the glass sheet 16 and the forming bar 5, this air flow is made to pass at high speed along the glass sheet 16 and thus achieves the required good heat transfer.

It is essential for the shaping of the glass sheets and for tempering that the rate of advance of the glass sheet 1 or 16 be higher when it leaves the furnace than within the furnace itself, so that the glass sheet 1 shall move especially through the shaping region 4 at higher speed and hence that the time for "sinking" into the gaps between the forming bars 5 or the advance bars 3 shall be less; in this manner it is possible to avoid the wavy warpings of the surface of the glass sheet.

We claim:

1. An apparatus for bending to a desired curvature a substantially planar glass sheet heated in a furnace to the softening point temperature of the glass, the apparatus comprising:
   a. a shaping region having an upper level and a lower level;
   b. means for advancing said planar glass sheet from said furnace to said upper level of said shaping region, said advancing means including a plurality of straight, spaced-apart first advance bars positioned outside of said shaping region and a plurality of straight, spaced-apart second advance bars positioned within said shaping region, said first and second advance bars defining a first horizontal surface aligned with said upper level, said first and second advance bars supporting said planar glass sheet and being rotatable for advancing said planar glass sheet onto said second advance bars in said shaping region, said second advance bars being lowerable to lower said glass sheet from said upper level to said lower level of said shaping region;
   c. a plurality of curved, spaced-apart forming bars located in said lower level of said shaping region and defining a curved surface corresponding to said desired curvature of said glass sheet, said forming bars being aligned vertically with the spaces between said second advance bars and being rotatable for advancing said glass sheet out of said forming region as said glass sheet is being bent to said desired curvature;

d. means for lowering said second advance bars to said lower level of said shaping region, said lowered second advance bars being positioned in the spaces between said forming bars and defining a second horizontal surface aligned with the lowermost position of said curved surface defined by said forming bars; and e. pressing means, located in said shaping region, for bending said glass sheet to said desired curvature, said pressing means being lowered from said upper level to said lower level of said forming region simultaneously with the lowering of said second advance bars and including a pressing roller positioned above and aligned with one of said second advance bars, said pressing roller being rotatable in a substantially vertical plane parallel with the advancing direction of said glass sheet and contacting said glass sheet supported on said second advance bars prior to the lowering of said second advance bars, and said pressing means further including a pressing cylinder exerting a force forcing said pressing roller to press said glass sheet against said one second advance bar aligned with said pressing roller prior to and during the lowering of said second advance bars, said glass sheet being pressed against said forming bars and bent into said desired curvature as said second advance bars are lowered to align with the lowermost position of said curved surface defined by said forming bars.

2. The apparatus of claim 1, wherein said force exerted by said pressing cylinder is adjustable.

3. The apparatus of claim 1, wherein said pressing means lifts said pressing cylinder from said glass sheet being advanced through said lower level of said forming region before said pressing roller contacts the rear edge of said glass sheet.

4. The apparatus of claim 1, wherein said pressing means is connected to said second advance bars by a vertically displaceable yoke structure.

5. The apparatus of claim 1, wherein said pressing roller is freely rotatable.

6. The apparatus of claim 1, wherein said pressing roller is rotatably driven at a speed corresponding to the rate of advance of said glass sheet through said lower level of said shaping region.

7. The apparatus of claim 1, further comprising a tempering region adjacent said lower level of said shaping region; a plurality of curved, spaced-apart third advance bars downstream of said forming bars, said third advance bars being rotatable for advancing said glass sheet curved in said forming region out of said forming region and through said tempering region; and means for tempering said curved glass sheet advanced out of said forming region through said tempering region.

8. The apparatus of claim 7, wherein said tempering means includes a plurality of first nozzle ribs positioned in the spaces between said third advance bars, said first nozzle ribs having a curved portion facing said curved glass sheet advanced through said tempering region by said third advance bars, said curved portion having a shape corresponding to said curved glass sheet and having a plurality of gas jets directing tempering gas against the lower face of said curved glass sheet both perpendicularly and obliquely to said curved glass sheet.

9. The apparatus of claim 7, wherein said tempering means includes a plurality of first nozzle ribs, each of said first nozzle ribs being aligned with and integrated with an individual one of said third advance bars, said first nozzle ribs directing tempering gas along the outer surfaces of said third advance bars by the Coanda effect and against the lower face of said curved glass sheet.

10. The apparatus of claim 9, wherein the outer cover of said third advance bars comprises a plurality of axially spaced-apart rings, said tempering gas flowing through the spaces between said rings.

11. The apparatus of any of claims 8 through 10, wherein said tempering means further includes a plurality of second nozzle ribs positioned above said curved glass sheet opposite said first nozzle ribs, said second nozzle ribs having a curved portion facing said curved glass sheet supported by said third advance bars, said curved portion having a shape corresponding to said curved glass sheet and having a plurality of gas jets directing tempering gas against the upper face of said curved glass sheet.

12. The apparatus of claim 11, further including throttling means positioned between said second nozzle ribs above said curved glass sheet.

13. The apparatus of claim 1 or 7, wherein each of said advance bars and forming bars includes a core portion and a rotatable outer cover.

14. The apparatus of claim 1 or 7, wherein said advance bars advance said glass sheet at a higher rate of speed than the rate of speed of said glass sheet inside said furnace.

* * * * *